(12) United States Patent
Tsutsumi et al.

(10) Patent No.: US 9,079,800 B2
(45) Date of Patent: Jul. 14, 2015

(54) COMPOSITE CERAMIC BODY, AND COMPONENT MEMBER FOR SEMICONDUCTOR MANUFACTURING APPARATUS

(71) Applicant: NIPPON TUNGSTEN CO., LTD, Fukuoka (JP)

(72) Inventors: Kouta Tsutsumi, Fukuoka (JP); Ryou Matsuo, Fukuoka (JP); Mitsuyoshi Nagano, Fukuoka (JP)

(73) Assignee: NIPPON TUNGSTEN CO., LTD, Fukuoka (JP)

( * ) Notice: Subject to any disclaimer, the term of this patent is extended or adjusted under 35 U.S.C. 154(b) by 73 days.

(21) Appl. No.: 13/864,967

(22) Filed: Apr. 17, 2013

(65) Prior Publication Data

US 2013/0299749 A1 Nov. 14, 2013

(30) Foreign Application Priority Data

Apr. 19, 2012 (JP) .................... 2012-95998

(51) Int. Cl.
*H01B 1/08* (2006.01)
*C04B 35/04* (2006.01)
(Continued)

(52) U.S. Cl.
CPC ............... *C04B 35/505* (2013.01); *B82Y 30/00* (2013.01); *C04B 35/04* (2013.01); *C04B 35/053* (2013.01); *C04B 35/44* (2013.01); *C04B 35/443* (2013.01); *C04B 35/6261* (2013.01); *C04B 35/645* (2013.01); *H01B 1/08* (2013.01); *C04B 2235/3206* (2013.01); *C04B 2235/3217* (2013.01); *C04B 2235/3225* (2013.01);
(Continued)

(58) Field of Classification Search
CPC ............... H01B 1/08; C01F 5/00; C01F 5/02; C04B 35/04; C04B 111/94
USPC ............. 252/518.1, 520.5; 501/108, 118, 127
See application file for complete search history.

(56) References Cited

U.S. PATENT DOCUMENTS 6,916,559 B2 * 7/2005 Murakawa et al. ........... 428/697

FOREIGN PATENT DOCUMENTS

| JP | 2000313656 | 11/2000 |
| JP | 2002362966 | 12/2002 |

OTHER PUBLICATIONS

Wang et al "Eutectic precipitation in a solidified Y3Al5O12—MgAl2O4 composite", Journ. Mat. Sci. Lett. 18 (1999) 1325-1327.*

(Continued)

*Primary Examiner* — Mark Kopec
(74) *Attorney, Agent, or Firm* — Paul D. Bianco; Martin Fleit; Fleit Gibbons Gutman Bongini & Bianco PL

(57) ABSTRACT

A composite ceramic body which includes three phases consisting of a MgO phase, a YAP (YAlO$_3$) phase and a spinel (MgAl$_2$O$_4$) phase. This composite ceramic body has a plasma resistance greater than that of alumina and approximately equal to that of MgO. Mechanical properties, such as hardness and bending strength, of the composite ceramic body, are approximately equal or superior to those of Al$_2$O$_3$. A raw material cost and a manufacturing cost thereof are lower than those of a rare-earth oxide. Further, electric conductive particles may be added thereto to lower an electrical resistivity. The composite ceramic body is suitably usable as component parts for a semiconductor manufacturing equipment.

8 Claims, 4 Drawing Sheets

(51) Int. Cl.
- *C04B 35/505* (2006.01)
- *C04B 35/053* (2006.01)
- *C04B 35/44* (2006.01)
- *C04B 35/443* (2006.01)
- *C04B 35/626* (2006.01)
- *C04B 35/645* (2006.01)
- *B82Y 30/00* (2011.01)

(52) U.S. Cl.
CPC . *C04B2235/3813* (2013.01); *C04B 2235/3839* (2013.01); *C04B 2235/3843* (2013.01); *C04B 2235/3847* (2013.01); *C04B 2235/3873* (2013.01); *C04B 2235/3886* (2013.01); *C04B 2235/3891* (2013.01); *C04B 2235/422* (2013.01); *C04B 2235/425* (2013.01); *C04B 2235/5288* (2013.01); *C04B 2235/768* (2013.01); *C04B 2235/80* (2013.01); *C04B 2235/96* (2013.01); *C04B 2235/9692* (2013.01)

(56) References Cited

OTHER PUBLICATIONS

Posarac et al "The effect of Y2O3 addition on thermal shock behavior of magnesium aluminate spinel", Science of Sintering, 41 (2009) 75-81.*

* cited by examiner

| Sample No. | Starting raw material (mass%) | | | | Composition of sintered body (volume%) | | | | $S_{YAP}/(S_{YAP}+S_{MgAl_2O_4})$ |
|---|---|---|---|---|---|---|---|---|---|
| | MgO | Al₂O₃ | Y₂O₃ | C | MgO | MgAl₂O₄ | YAP | C | |
| 1 | 88.7 | 6.3 | 5.0 | 0.0 | 89.2 | 5.8 | 5.0 | 0.0 | 0.46 |
| 2 | 85.0 | 10.0 | 5.0 | 0.0 | 83.9 | 11.1 | 5.0 | 0.0 | 0.31 |
| 3 | 69.5 | 20.0 | 10.5 | 0.0 | 66.8 | 22.5 | 10.8 | 0.0 | 0.32 |
| 4 | 70.8 | 28.2 | 1.0 | 0.0 | 60.0 | 39.0 | 1.0 | 0.0 | 0.03 |
| 5 | 64.9 | 24.6 | 10.5 | 0.0 | 60.0 | 29.2 | 10.8 | 0.0 | 0.27 |
| 6 | 54.9 | 34.6 | 10.5 | 0.0 | 45.3 | 43.9 | 10.8 | 0.0 | 0.20 |
| 7 | 53.4 | 34.5 | 12.1 | 0.0 | 44.4 | 43.1 | 12.5 | 0.0 | 0.22 |
| 8 | 39.0 | 40.0 | 21.0 | 0.0 | 29.9 | 47.4 | 22.7 | 0.0 | 0.32 |
| 9 | 30.3 | 30.2 | 39.5 | 0.0 | 31.3 | 21.3 | 47.4 | 0.0 | 0.69 |
| 10 | 25.7 | 33.0 | 41.3 | 0.0 | 24.9 | 25.0 | 50.1 | 0.0 | 0.67 |
| 11 | 30.8 | 58.7 | 10.5 | 0.0 | 10.0 | 79.2 | 10.8 | 0.0 | 0.12 |
| 12 | 30.1 | 57.8 | 12.1 | 0.0 | 10.0 | 77.6 | 12.5 | 0.0 | 0.14 |
| 13 | 14.2 | 38.0 | 47.8 | 0.0 | 10.0 | 29.7 | 60.3 | 0.0 | 0.67 |
| 14 | 9.2 | 31.8 | 59.0 | 0.0 | 10.0 | 10.0 | 80.0 | 0.0 | 0.89 |
| 15 | 60.0 | 35.0 | 5.0 | 0.0 | 48.1 | 46.9 | 5.0 | 0.0 | 0.10 |
| 16 | 67.5 | 19.4 | 10.2 | 2.9 | 63.5 | 21.4 | 10.2 | 4.9 | 0.32 |
| 17 | 66.2 | 19.0 | 10.0 | 4.8 | 61.5 | 20.7 | 9.9 | 7.9 | 0.32 |
| *18 | 84.8 | 4.7 | 10.5 | 0.0 | 89.2 | 0.0 | 10.8 | 0.0 | 1.00 |
| *19 | 92.3 | 7.7 | 0.0 | 0.0 | 89.2 | 10.8 | 0.0 | 0.0 | 0.00 |
| *20 | 24.0 | 65.4 | 10.6 | 0.0 | 0.0 | 89.2 | 10.8 | 0.0 | 0.11 |
| *21 | 100.0 | 0.0 | 0.0 | 0.0 | MgO single phase | | | | – |
| *22 | 0.0 | 0.0 | 100.0 | 0.0 | Y₂O₃ single phase | | | | – |
| *23 | 0.0 | 100.0 | 0.0 | 0.0 | Al₂O₃ single phase | | | | – |
| *24 | 0.0 | 31.1 | 68.9 | 0.0 | YAP single phase | | | | – |
| *25 | 28.3 | 71.7 | 0.0 | 0.0 | MgAl₂O₄ single phase | | | | – |

* Samples 18 to 25 are comparative samples other than inventive samples

FIG. 3

| Sample No. | Etching amount (with respect to $Al_2O_3$) | Hardness (Hv) | Bending strength (MPa) | Electric resistance($\Omega \cdot cm$) |
|---|---|---|---|---|
| 1 | 0.14 | 750 | 389 | $10^{14}$ or more |
| 2 | 0.15 | 857 | 432 | $10^{14}$ or more |
| 3 | 0.15 | 1025 | 570 | $10^{14}$ or more |
| 4 | 0.16 | 1031 | 355 | $10^{14}$ or more |
| 5 | 0.16 | 1054 | 565 | $10^{14}$ or more |
| 6 | 0.16 | 1077 | 522 | $10^{14}$ or more |
| 7 | 0.16 | 1102 | 562 | $10^{14}$ or more |
| 8 | 0.18 | 1294 | 400 | $10^{14}$ or more |
| 9 | 0.18 | 1274 | 417 | $10^{14}$ or more |
| 10 | 0.20 | 1283 | 481 | $10^{14}$ or more |
| 11 | 0.25 | 1341 | 377 | $10^{14}$ or more |
| 12 | 0.25 | 1353 | 376 | $10^{14}$ or more |
| 13 | 0.23 | 1371 | 382 | $10^{14}$ or more |
| 14 | 0.23 | 1404 | 345 | $10^{14}$ or more |
| 15 | 0.16 | 1052 | 344 | $10^{14}$ or more |
| 16 | 0.15 | 772 | 461 | $10^5$ |
| 17 | 0.25 | 685 | 433 | $10^3$ or less |
| *18 | 0.14 | 712 | 327 | $10^{14}$ or more |
| *19 | 0.15 | 710 | 289 | $10^{14}$ or more |
| *20 | 0.28 | 1403 | 308 | $10^{14}$ or more |
| *21 | 0.13 | 550 | 248 | $10^{14}$ or more |
| *22 | 0.25 | - | - | - |
| *23 | 1.00 | - | - | - |
| *24 | 0.25 | - | - | - |
| *25 | 0.28 | - | - | - |

FIG. 4

COMPOSITE CERAMIC BODY, AND COMPONENT MEMBER FOR SEMICONDUCTOR MANUFACTURING APPARATUS

TECHNICAL FIELD

The present invention is composite ceramic body which is suitably usable for component parts for semiconductor manufacturing equipment. Particularly, the ceramic body is usable for the parts, electrostatic chucks, ring shaped parts, shower heads, chambers, to be exposed to a plasma treatment with corrosive gas in the semiconductor manufacturing process.

BACKGROUND ART

Component parts inside a chamber of plasma etching equipment or the like in a semiconductor manufacturing process are exposed to corrosive environments with a corrosive gas. When the corrosive gas is activated by plasma, a corrosion phenomenon becomes more prominent.

On a surface of the component parts exposed to the corrosive gas, a reaction product between the component parts and the corrosive gas is formed. As a result of this reaction, the component parts are corroded and change in their shapes. Finally, it becomes impossible to keep their shapes as designed.

During the formation of the reaction product, vaporization, volatilization and flaking of the reaction product occur. Consequently, particles are formed in the chamber, which cause contamination of an inside of the chamber and an etching target object (particularly, a semiconductor wafer). If such particles adhere to the etching target object, the defects occur, such as insulation defects or shape defects. It could be a factor of hindering yield enhancement in a semiconductor manufacturing process.

For example, aluminum, aluminum alloy, alumited aluminum (aluminum subjected to an alumite treatment), aluminum oxide ($Al_2O_3$) or aluminum nitride (AlN) has heretofore been used as a material for a component parts to be exposed to a corrosive gas or a plasma treatment using a corrosive gas. However, these materials do not have sufficient resistance to corrosion. Therefore, an improved high corrosion resistant material is being required in order to improve the quality and yield enhancement in the semiconductor manufacturing process.

Currently, yttrium oxide ($Y_2O_3$) and yttrium aluminum garnet (YAG) are drawing attention because of their excellent resistance to corrosion as compared to the above mentioned aluminum alloy and aluminum oxide. However, $Y_2O_3$ and YAG-based ceramic materials have difficulty in obtaining a dense sintered body due to its poor sinterability. Moreover, they have low mechanical strength (strength, hardness). For these reasons, $Y_2O_3$ and YAG-based ceramic materials have been scarcely put to practical use. Further, $Y_2O_3$ and YAG-based ceramic materials which contain a large amount of rare-earth element are costly as compared to other ceramic materials. An efficient improvement for cost reduction is necessary to realize practical applications of $Y_2O_3$ or YAG-based ceramic material.

Magnesium oxide (MgO) also has great potential as a corrosion resistant material, because it is excellent in resistance to corrosion as compared to the above aluminum alloy and aluminum oxide. Depending on corrosive conditions, magnesium oxide has higher resistance to corrosion than those of the above yttrium oxide and yttrium aluminum garnet. Further, the element magnesium has the 8th highest Clarke number, and thereby magnesium oxide is extremely low in cost. Therefore, adopting magnesium oxide can contribute to improve corrosion resistance and cost reduction. In addition, magnesium oxide has higher thermal conductivity than those of the above aluminum oxide, yttrium oxide and yttrium aluminum garnet. Their feature of the high thermal conductivity is useful in the process with high-temperature treatment and in the process requiring a uniform heating ability.

On the other hand, it is difficult to obtain a dense sintered body of magnesium oxide. Moreover, magnesium oxide has hardness (Vickers hardness) of about 550 Hv and a bending strength of about 250 MPa, even in the form of a dense sintered body. These physical property values are particularly low among structural ceramic materials. In order to allow a magnesium oxide-based ceramic material to be used for various component parts like component parts for semiconductor manufacturing equipment, it is necessary to improve mechanical property.

Heretofore, there have been various proposals which can improve their sinterability and mechanical strength of a magnesium oxide-based ceramic material.

As one example, the following Patent Document 1 discloses a ceramic material which contains 5 to 95 weight % of magnesium oxide, with the remainder being rare-earth element-containing oxide or composite oxide. In the example of the specification, the Patent Document 1 also discloses a composite ceramic material which contains magnesium oxide, with the remainder being yttrium oxide or YAG.

However, in the Patent Document 1, when the remainder is yttrium oxide, a resulting composite ceramic material becomes insufficient in hardness. This is because both of magnesium oxide and yttrium oxide are low in hardness. Moreover, the composite ceramic material consisting of magnesium oxide and yttrium oxide has difficulty in densification by sintering, and exhibits low bending strength.

In the Patent Document 1, in order to allow the composite ceramic material consisting of magnesium oxide and rare-earth-containing composite oxide such as YAG to have improved mechanical properties, it is necessary to increase an amount of the rare-earth-containing composite oxide. However, this causes a deterioration in resistance to corrosion, a lowering in thermal conductivity and an increase in manufacturing cost of a resulting composite ceramic material. Therefore, it is desired to maintain the mechanical properties while reducing the amount of the rare-earth-containing composite oxide.

The following Patent Document 2 discloses a composite ceramic material which consists substantially of MgO, $Al_2O_3$, and $ZrO_2$ and/or $Y_2O_3$, wherein a composition ratio of MgO to $Al_2O_3$ by weight ratio is set in the range of 0.67 to 2.33, and $ZrO_2$ and/or $Y_2O_3$ are contained in a total amount of 1 to 10 weight %.

However, in the composite ceramic material disclosed in the Patent Document 2, a resistance to corrosion of $Al_2O_3$ and $ZrO_2$ is largely inferior to that of MgO. Thus, an $Al_2O_3$ phase and a $ZrO_2$ phase are selectively corroded at an early stage. Moreover, $ZrO_2$ is transformed along with a volume change caused by a temperature rise. Therefore, a $ZrO_2$-containing ceramic body is easily broken due to a temperature change.

The Patent Document 2 also discloses a ceramic material containing no $ZrO_2$. However, in the case where the composite ceramic material in the Patent Document 2 contains no $ZrO_2$, hardness and bending strength are lowered. Specifically, the hardness and bending strength become less than those of the conventional aluminum oxide-based or aluminum nitride-based material used for component parts for a semiconductor manufacturing equipment.

In the specification including Example, the Patent Document 2 mentions that the $Al_2O_3$ may be replaced with spinel ($MgAl_2O_4$). Spinel has higher resistance to corrosion than that of alumina. However, even this replacement cannot compensate for an insufficiency in hardness of $Y_2O_3$ used for improving sinterability and strength, and an insufficiency in resistance to corrosion of $ZrO_2$. Moreover, the composition devoid of $ZrO_2$ is low in mechanical properties.

As above, conventional ceramic materials comprising Mg, Al, Y and O are as disclosed in the Patent Documents 1 and 2. However, in the Patent Documents, a reaction in high-temperature (sintering) conditions is not considered. The Patent Documents simply disclose producing a ceramic material comprising Mg, Al, Y and O, but scarcely discloses physical properties and a composition after burning.

An actual sintered body of a ceramic material comprising Mg, Al, Y and O can take various composites depending on a ratio between the elements. Although the Patent Document 2 mentions that aluminum oxide and magnesium oxide react with each other to form spinel, it makes no mention of other reaction, particularly, a reaction of rare-earth oxide. For example, in a sintered body obtained by mixing magnesium oxide, aluminum oxide and YAG, and sintering the mixture, YAG can actually remain only on a condition that the mixture is set in a limited composition range. This means that a ceramic material comprising Mg, Al, Y and O is formed as totally different products (sintered bodies) depending on a ratio between the elements and an amount of oxygen.

Generally, an oxide-based ceramic body including a magnesium oxide-based ceramic body, a nitride-based ceramic body including an aluminum nitride-based ceramic body and the like is an electrical insulating body. However, component parts to be used inside a semiconductor manufacturing equipment, such as electrostatic chucks, ring shaped parts, shower heads and chambers, are required to have a low electrical resistivity, in some cases. This is because when an electrical insulating ceramic body is used as each of the above component parts, a surface of the component parts is electrostatically charged, so that the aforementioned reaction product is more likely to adhere to the surface of the component parts. If the reaction product flakes off from the component parts and drops on a semiconductor wafer, the semiconductor wafer becomes defective. Moreover, the electrostatic charge of the component parts causes abnormal electrical discharge. In contrast, when the component parts have a low electrical resistivity, it becomes free of electrostatic charge, thereby preventing the occurrence of the above problems.

Further, the component parts to be used within the semiconductor manufacturing equipment, such as electrostatic chucks, ring shaped parts, shower heads and chambers, are different from each other in terms of a required electrical resistivity. Thus, a conventional electrical insulating ceramic body having an electrical resistivity of $10^{15}$ Ω·cm or more is likely to fail to obtain sufficient properties. That is, it is necessary to adjust an electrical resistivity of a ceramic body for each intended use.

LIST OF PRIOR ART DOCUMENTS

Patent Documents

Patent Document 1: JP 2002-362966A
Patent Document 2: JP 2000-313656A

SUMMARY OF THE INVENTION

Technical Problem

The above conventional techniques will be outlined as follows. Materials, such as aluminum, aluminum alloy, alumited aluminum and aluminum oxide, are mainly used for component parts within an equipment for performing a plasma treatment using a corrosive gas, in a semiconductor manufacturing process. However, these materials are low in resistance to corrosion. Thus, the component parts have a problem that it undergoes corrosion or generates particles.

With a view to solving this problem, there has been proposed high corrosion resistant materials consisting mainly of a ceramic material comprising a rare-earth element such as yttrium oxide and/or yttrium aluminum garnet (YAG). However, these ceramic materials have difficulty in obtaining a dense sintered body due to its poor sinterability. Moreover, it is costly.

On the other hand, a magnesium oxide-based sintered body is high in resistance to corrosion, and low in cost of its raw material. Therefore, a high corrosion resistant material containing magnesium oxide has been proposed. However, the magnesium oxide-based sintered body has a problem that it is low in hardness and bending strength.

Further, component parts for a semiconductor manufacturing equipment are required to have a low electrical resistivity, in some cases. Thus, it is necessary to meet such a requirement.

In view of the above conventional problems, it is an object of the present invention to provide a magnesium oxide-containing composite ceramic body suitable as component parts for a semiconductor manufacturing equipment, by improving mechanical properties such as hardness and bending strength, while suppressing a deterioration in excellent resistance to corrosion of magnesium oxide.

As used in this specification, the term "resistance to corrosion" means resistance to a halogen-based corrosive gas or to a plasma treatment using a halogen-based corrosive gas.

Solution to the Technical Problem

In order to solve the above problems, regarding a ceramic material comprising Mg, Al, Y and O, the inventors of the present invention have checked a relationship between a starting raw material and a resulting sintered body in details, and have specified a composition excellent in resistance to corrosion and strength.

Specifically, the inventers firstly selected magnesium oxide as a ceramic material to obtain a ceramic body low in cost and excellent in resistance to corrosion, as compared to a ceramic body consisting primarily of rare-earth element-containing oxide.

However, magnesium oxide is low in hardness and bending strength as mentioned above, so that it is not suitable for use for component parts for a semiconductor manufacturing equipment, due to the poor mechanical properties.

Therefore, the inventors made a concept of compositely combining magnesium oxide with different types of ceramic materials to allow a dense composite ceramic body to be obtained, thereby improving the hardness and bending strength. In this case, the ceramic material to be compositely combined with magnesium oxide is required to have high mechanical properties and high resistance to corrosion. Further, each of phases comprised in the composite ceramic body is required to have stability under a high-temperature environment. Therefore, for each of the phases, it is necessary to select a composition free of a compositional change and an inter-phase reaction under high temperatures.

Through diligent researches for meeting the above requirements, the inventors have finally specified, as a desirable ceramic body, a composite ceramic body comprising three phases, namely a magnesium oxide (MgO) phase, a spinel ($MgAl_2O_4$) phase, and a YAP ($YAlO_3$) phase.

The reasons will be described below. Spinel ($MgAl_2O_4$) and YAP ($YAlO_3$) have a high hardness (Vickers hardness) of about 1400 Hv. Further, resistances to corrosion of them are largely superior to that of aluminum oxide. The inventers also ascertained that the resistances to corrosion of spinel ($MgAl_2O_4$) and YAP ($YAlO_3$) are equal to that of yttrium oxide. Yttrium oxide is excellent in resistance to corrosion, and is thereby drawing attention as a corrosion resistant material. The magnesium oxide phase, the spinel phase and the YAP phase are stable without causing any inter-phase reaction, even under high temperatures. The three phases are different from each other in terms of various properties such as thermal conductivity, thermal expansion coefficient and permittivity. Therefore, the properties can be controlled by changing mixing ratios of the three phases.

As yttrium aluminum oxide, there are three compound phases, namely YAP ($YAlO_3$), YAG ($Y_3Al_5O_{12}$) and YAM ($Y_4Al_2O_9$). In particular, YAG is drawing attention because of its optical properties and mechanical properties. In fact, a technique of adding YAG to MgO to improve strength of a ceramic body has been published.

However, the inventors found the following fact. In the case where either one of the three types of yttrium aluminum oxides (YAP, YAG, YAM) is mixed with a magnesium oxide phase and a spinel phase, and the obtained mixture is heated up to 1200° C. or more, only YAP can stably exist without any compositional change. When a ceramic body is formed as a composite body consisting of a magnesium oxide, a spinel and a yttrium aluminum oxide, YAP is optimal among the above three types.

A conventional composite ceramic body consisting of a magnesium oxide phase and a spinel phase and a conventional composite ceramic body consisting of a magnesium oxide phase and a YAP phase have mechanical properties slightly superior to that of magnesium oxide. The inventors further converted the two-phase composite ceramic body into a composite ceramic body comprising three phases consisting of a magnesium oxide phase, a spinel phase and a YAP phase. This composite ceramic body has further improved hardness and bending strength, as compared to the above two-phase composite ceramic body.

More specifically, in the case of the two-phase composite ceramic body consisting of a magnesium oxide phase and a YAP phase, when a content rate of the YAP phase is relatively small, sintered density becomes lower, resulting in failing to obtain sufficient hardness and bending strength. When a part of the magnesium oxide phase is replaced with a spinel phase, sinterbility of composite ceramic body has improved, and thereby exhibits significantly increased hardness and bending strength. Further, in order to allow the two-phase composite ceramic body consisting of a magnesium oxide phase and a YAP phase to obtain sufficient mechanical properties, it is necessary to add a substantial amount of the YAP phase. However, Y element-containing oxide and composite oxide are costly. Therefore, in the present invention, a part of the YAP phase is replaced with a spinel phase. This makes it possible to increase the hardness and bending strength of the composite ceramic body. Further, it becomes possible to reduce a manufacturing cost.

Comparing: the conventional two-phase composite ceramic body (1) consisting of a magnesium oxide phase and a spinel phase; the conventional two-phase composite ceramic body (2) consisting of a magnesium oxide phase and a YAP phase; and the composite ceramic body (3) of the present invention comprising three phases consisting of a magnesium oxide phase, a spinel phase and a YAP phase, the composite ceramic body (3) of the present invention can minimize an amount of a phase (a spinel phase and/or a YAP phase) other than a magnesium oxide phase, i.e., an amount of a phase necessary to improve the bending strength of the composite ceramic body. Thus, the composite ceramic body (3) has higher resistance to corrosion and higher thermal conductivity, as compared to the composite ceramic bodies (1) and (2). Further, the composite ceramic body (3) can obtain the highest bending strength.

Preferably, in the above composite ceramic body of the present invention, on an assumption that a volume percent of the YAP phase and a volume percent of the $MgAl_2O_4$ phase are represented, respectively, by $S_{YAP}$ (volume %) and $S_{MgAl}$ (volume %), the $S_{YAP}$ and the $S_{MgAl}$ satisfy the following relationship: $S_{YAP}/(S_{YAP}+S_{MgAl}) \leq 0.69$ When the $S_{YAP}$ and the $S_{MgAl}$ are set to satisfy the above relationship, the bending strength and hardness can be improved at low cost. That is, a ratio of the YAP phase containing a rare-earth element (Y) can be reduced to suppress the manufacturing cost.

More preferably, in the above composite ceramic body, on an assumption that a volume percent of the MgO phase is represented by $S_{MgO}$ (volume %), the $S_{MgO}$, the $S_{YAP}$ and the $S_{MgAl}$ satisfy the following relationships: when $S_{MgO} \geq 60$ (volume %), $S_{YAP} \geq 1$ (volume %) and $S_{MgAl} \geq 1$ (volume %); and when $10 \leq S_{MgO} < 60$ (volume %), $S_{YAP} \geq 10.5$ (volume %)

When the volume percents of the YAP phase and the spinal phase are set to satisfy the relationship: $S_{YAP}/(S_{YAP}+S_{MgAl}) \leq 0.69$, and the volume percents of the three phases are set to the above relationships, all of the hardness, the bending strength and the resistance to corrosion are further improved, and the manufacturing cost is further reduced.

That is, when $S_{YAP} \geq 10.5$ volume % and $S_{MgAl} \geq 1$ volume %, the sintered density becomes higher, and the bending strength becomes higher. Further, in order to maintain excellent resistance to corrosion of magnesium oxide, the $S_{MgO}$ is preferably set to the following range: $S_{MgO} \geq 10$ volume %.

When $S_{MgO} \geq 60$ volume %, the composite ceramic body has sufficient bending strength, as long as each of the spinel phase and the YAP phase is contained in an amount of 1 volume % or more, even if $S_{YAP} \leq 10.5$ volume %.

That is, under a condition that the $S_{YAP}$ and the $S_{MgAl}$ satisfy the relationship: $S_{YAP}/(S_{YAP}+S_{MgAl}) \leq 0.69$, when the $S_{MgO}$, the $S_{YAP}$ and the $S_{MgAl}$ satisfy the relationships: when $S_{MgO} \geq 60$ (volume %), $S_{YAP} \geq 1$ (volume %) and $S_{MgAl} \geq 1$ (volume %); and when $10 \leq S_{MgO} < 60$ (volume %), $S_{YAP} \geq 10.5$ (volume %), the composite ceramic body has particularly high hardness and bending strength. Further, it is not particularly necessary to use a large amount of rare-earth element, and a raw material cost can be reduced.

In the composite ceramic body of the present invention, a phase of electrical conductive substance may be further added to lower the electrical resistivity of the composite ceramic body. In some cases, an electric conductive composite ceramic body having an electrical resistivity adjusted to $10^{14}$ $\Omega \cdot cm$ or less is required for use, for example, in component parts for a semiconductor manufacturing equipment, such as electrostatic chucks, ring shaped parts, showerheads and chambers. The composite ceramic body having a low electrical resistivity makes it possible to prevent electrostatic charge of the component parts.

In the present invention, the electrical conductive substance phase may be contained in an amount of 0.01 to 50 volume % with respect to the entire composite ceramic body. This electrical conductive substance phase is a fourth phase. The fourth phase has low resistance to corrosion, as compared to the above three phases. However, as long as the content of the fourth phase is equal to or less than 50 volume %, the resistance to corrosion is not largely deteriorated.

The fourth phase is composed of an electrical conductive substance. As the electrical conductive substance, it is preferable to select a substance which is non-reactive with any of the three phases, i.e., the magnesium oxide phase, the spinel phase and the YAP phase. From this point of view, a material particularly suitable as the electrical conductive substance includes graphite, titanium carbide, titanium nitride, tungsten carbide, tungsten nitride, molybdenum carbide, molybdenum nitride, zirconium carbide, zirconium nitride, zirconium boride, zirconium silicide, and carbon nanotube. One or more of them or a solid solution of two or more of them may be added to the composite ceramic body so as to lower the electrical resistivity of the composite ceramic body.

Specifically, the electrical resistivity of the composite ceramic body of the present invention can be lowered by allowing the electrical conductive substance to be contained in an amount of 0.01 volume % or more. A composite ceramic body containing the electrical conductive substance in an amount of less than 0.01 volume % has an electrical resistivity of $10^{15}$ Ω·cm or more. On the other hand, a composite ceramic body containing the electrical conductive substance in an amount of greater than 50 volume % does not have sufficiently high resistance to corrosion. For example, a composite ceramic body containing graphite or titanium carbide in an amount of about 0.5 volume % or more has a black color.

The composite ceramic body of the present invention is particularly suitably usable for component parts to be exposed to a corrosive gas or a plasma treatment using a corrosive gas. For example, it may be used for component parts for a semiconductor manufacturing equipment, such as electrostatic chucks, ring shaped parts, shower heads and chambers. The use of the composite ceramic body of the present invention in such component parts allows the component parts to have improved resistance to corrosion. In addition, it becomes possible to improve problems in a semiconductor manufacturing process, such as a change in shape of the component parts and generation of particles.

Effect of the Invention

The composite ceramic body of the present invention can be used as component parts for an equipment designed to perform a plasma treatment, such as a plasma etching equipment, so as to reduce corrosion and generation of particles. The composite ceramic body of the present invention has significantly high mechanical properties, as compared to a conventional magnesium oxide-based ceramic body. Thus, it can also be used for component parts requiring hardness and bending strength. The composite ceramic body of the present invention can have an electrical resistivity lowered by adding an electrical conductive substance thereto. In this case, it is usable as component parts having a need to adjust an electrical resistivity thereof. Further, the composite ceramic body of the present invention can suppress abnormal discharge in a plasma etching equipment, and generation of particles caused by the abnormal discharge.

As above, the composite ceramic body of the present invention makes it possible to improve properties of component parts for a semiconductor manufacturing equipment, and thus improve performance and quality of a semiconductor.

BRIEF DESCRIPTION OF THE DRAWINGS

FIG. 3 illustrates sample composition analysis.

FIG. 4 illustrates sample mechanical and electrical property analysis.

DESCRIPTION OF EMBODIMENTS

A composite ceramic body of the present invention comprises at least three phases. The three phases consists of a magnesium oxide (MgO) phase, a spinel ($MgAl_2O_4$) phase, and a YAP ($YAlO_3$) phase.

The composite ceramic body of the present invention can be produced in the following manner.

First of all, a starting raw material is selected from the following four types (1) to (4) of combinations of raw material powers:

(1) a combination of a magnesium oxide powder, a spinel powder and a YAP powder;

(2) a combination of a magnesium oxide powder, a spinel powder, an aluminum oxide powder and a yttrium oxide powder;

(3) a combination of a magnesium oxide powder, an aluminum oxide powder and a YAP powder; and (4) a combination of a magnesium oxide powder, an aluminum oxide powder and a yttrium oxide powder.

Mixing ratios of the raw material powders of the starting raw material are set within a composition range which allows the three phases consisting of the magnesium oxide phase, the spinel phase and the YAP phase to be obtained after sintering. If the mixing ratios are not adequate, an aluminum oxide phase, a $Y_2O_3$ phase, a YAG phase or a YAM phase is formed in a sintering step.

That is, the mixing ratios of the raw material powders must be set to allow respective molar numbers (molar ratios) of Mg atoms, Al atoms and Y atoms to fall within the following range:

Molar number of Al>molar number of Y (Formula 1)

Molar number of Mg>(molar number of Al−molar number of Y)/2 (Formula 2)

Figure 1:
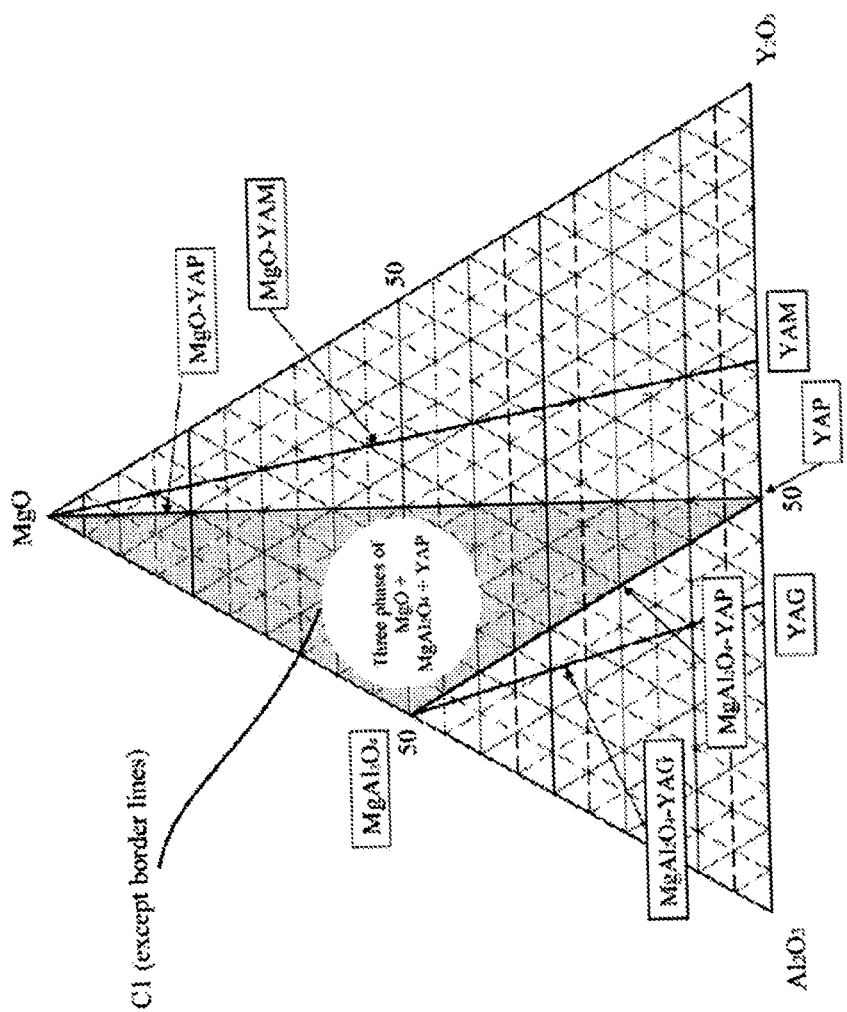
FIG. 1 illustrates a composition range (molar ratio) of a starting raw material for obtaining a composite ceramic body of the present invention (in the case where a raw material powder is a combination of $Y_2O_3$, $Al_2O_3$ and MgO powders).

This range is illustrated in FIG. 1 in the form of a ternary diagram of a MgO—$Al_2O_3$—$Y_2O_3$ starting raw material. In FIG. 1, an inside (except border lines) of a range C1 defined by connecting MgO, YAP and $MgAl_2O_4$ is a composition range of a starting raw material capable of obtaining the composite ceramic body of the present invention. The three lines surrounding the range C1 represent a range of molar fractions of MgO, $Y_2O_3$ and $Al_2O_3$ for obtaining the three-phase containing composite ceramic body of the present invention.

The range C1 illustrated in FIG. 1 is a range to be defined when a simplest combination MgO—$Al_2O_3$—$Y_2O_3$ is selected as a raw material powder. This range may also be used when any other combination of raw material powders is used as a raw material powder. Even when a different starting raw material is used, the composite ceramic body of the present invention comprising three phases consisting of a magnesium oxide (MgO) phase, a spinel ($MgAl_2O_4$) phase and a YAP ($YAlO_3$) phase can also be obtained by calculating only molar numbers (molar ratios) of Mg, Al and Y thereof and adjusting them to fall within the range C1. That is, the composite ceramic body of the present invention comprising three phases consisting of a magnesium oxide phase, a spinel phase and a YAP phase can be obtained by adjusting mixing ratios of the starting material to satisfy the above Formulas (1) and (2).

After combining the raw material powders to allow the composition ratio thereof to fall within the range C1 in the above manner, the obtained starting raw material is mixed. The mixing may be performed using a ball mill or a bead mill. This makes it possible to obtain a starting raw material excellent in dispersibility and sinterability of the raw material powders. The magnesium oxide powder reacts with water to form magnesium hydrate. Thus, as a solvent for use in the mixing, it is preferable to use an organic solvent such as methanol. Further, an organic binder may be added to the starting material so as to improve formability.

After the mixing, the starting material is subjected to press forming under pressure. The press forming may be performed by a die forming process or a CIP (Cold Isostatic Press) forming process. When an obtained shaped body contains an organic binder, it is subjected to a binder removal treatment, before sintering.

The shaped body is subjected to sintering at a sintering temperature of 1400 to 1900° C. to obtain a sintered body. This sintered body is the composite ceramic body of the present invention.

A burning atmosphere may be selected from conventional atmospheres, such as air, argon, nitrogen and vacuum. Among them, argon atmosphere or air atmosphere is particularly preferable. The obtained sintered body may further be subjected to a heat treatment in air atmosphere to improve color unevenness and perform homogenization.

In case of employing hot press sintering, the above forming step is not essential. For example, the mixed starting raw material may be subjected to hot press, while being charged in a carbon die.

As mentioned above, the starting raw material is prepared to allow the three phases consisting of the magnesium oxide phase, the spinel phase and the YAP phase to be formed. However, it is extremely difficult to achieve a fully dispersed state of components (raw material powders) in the starting raw material. Consequently, the sintered body is likely to locally have an unintentional phase other than the three phases. In this case, a phase unintentionally formed in the sintered body is a YAG phase and/or a YAM phase. For example, when the starting raw material comprises a coarse raw material powder having a particle size of 100 μm or more, the formation of the YAG and YAM phases is more likely to occur. It is difficult to completely prevent the formation of the YAG and YAM phases. However, based on improvement in conditions of the mixing and sintering of the starting raw material, an amount of the YAG and YAM phases can be suppressed to become sufficiently less than that of the YAP phase. As long as a total amount of the YAG and YAM phases is about 10 volume % or less, they do not exert a negative influence on the resistance to corrosion and mechanical strength of the composite ceramic body of the present invention.

Figure 2:
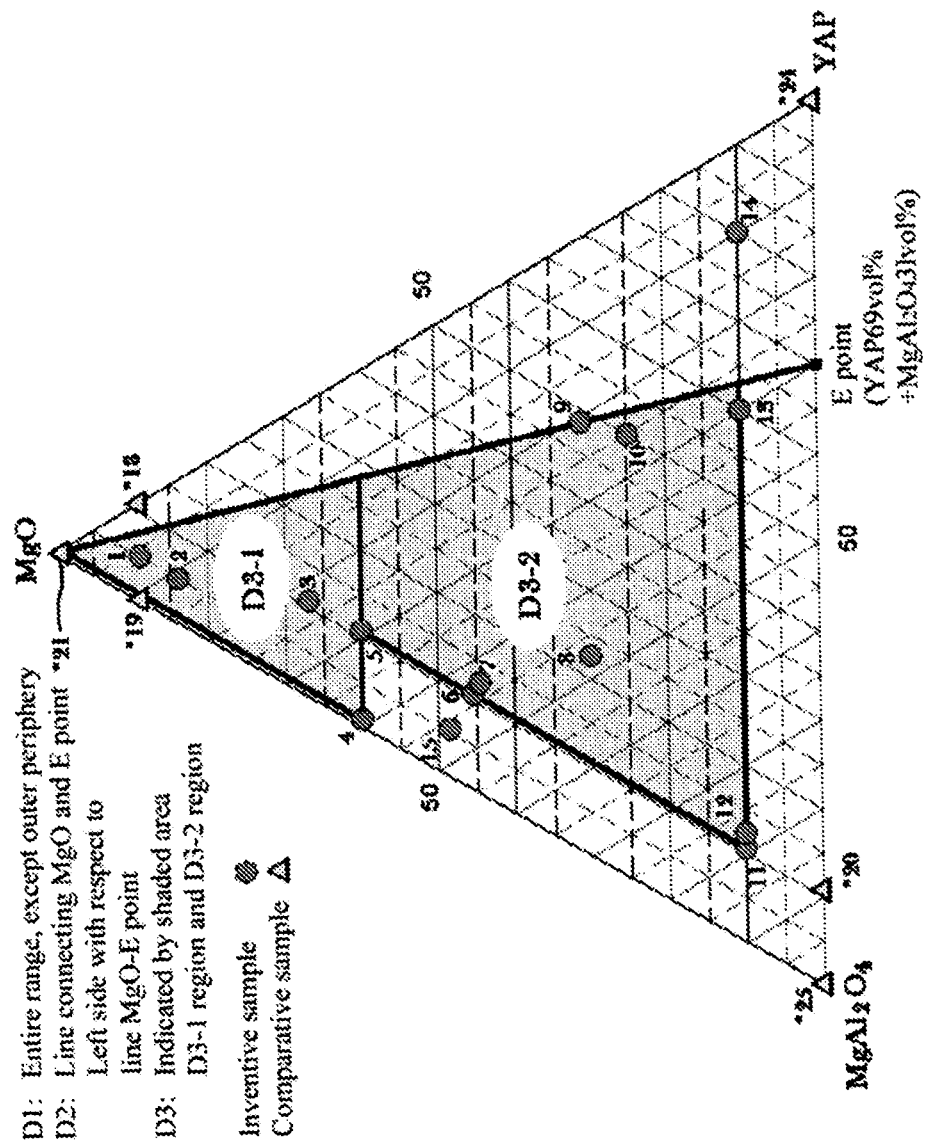
FIG. 2 illustrates a composition range of the composite ceramic body of the present invention.

A composition range of the composite ceramic body (sintered body) of the present invention is described in a MgO-YAP-$MgAl_2O_4$ ternary composition diagram of FIG. 2. The composition described in FIG. 2 is represented by volume percent. A range D1 of the composite ceramic body of the present invention is an inside of the largest triangle (except an outer peripheral line) in FIG. 2. An apex of the largest triangle indicates a one-phase ceramic body, and an outer peripheral line indicates a two-phase ceramic body. These are beyond the range defined by the present invention.

In the composite ceramic body of the present invention, a particularly excellent range: $S_{YAP}/(S_{YAP}+S_{MgAl})≤0.69$, is the range D2 in FIG. 2. Specifically, it is a region where a volume % of $MgAl_2O_4$ in the composition of the composite ceramic body becomes larger with respect to the line connecting MgO and an E point.

In the composite ceramic body, a more excellent range is a region in the range D2 satisfying the following relationships:
when $S_{MgO}≥60$ (volume %), $S_{YAP}≥1$ (volume %) and $S_{MgAl}≥1$ (volume %) (D3-1); and
when $10≤S_{MgO}<60$ (volume %), $S_{YAP}≥10.5$ (volume %) (D3-2).
This range is a total of the ranges D3-1 and D3-2 in FIG. 2.

EXAMPLES

Example 1

Example 1 is a result of evaluation on composition and bending strength of a composite ceramic body.
(Preparation of Samples)
As raw material powders for a starting raw material, a high-purity MgO powder with a purity of 99.9% or more, a high-purity $Al_2O_3$ powder with a purity of 99.9% or more, a high-purity $Y_2O_3$ powder with a purity of 99.9% or more, and a high-purity graphite (C) powder with a purity of 99.9% or more, were selected. The raw material powders were subjected to weighting and then mixing using a ball mill. Mixing ratios of the raw material powders are illustrated in FIG. 3.

In the ball mill mixing, a 2 L pot made of nylon and high-purity spherical zirconia balls having a diameter of 5 to 12 mm were used. A methanol solvent and the balls were added to the starting raw material prepared by combining the raw material powders, and the obtained mixture was mixed in the pot for 24 hours. After the mixing, an obtained slurry was dried at 60° C. to obtain a cake. The cake was pulverized by an agate mortar, and subjected to particle size regulation using a sieve having a mesh size of 300 μm. The sieved powder was formed into a given shape using a uniaxial die at 20 MPa. The shaped body had a size of 52.5 mm on a side and about 10 mm thickness. The shaped body was subjected to hot press sintering to obtain a sintered body. The sintering was performed in an argon atmosphere. A sintering temperature was set in the range of 1500 to 1700° C. A maximum pressure during the hot press was set to 15 MPa. The hot press was performed using a hot press sintering mold made of carbon. The sintered body was subjected to grinding using a surface grinning machine to grind a surface thereof by a depth of about 100 μm, and the obtained piece was used as an evaluation sample.

Similarly, a sample consisting of two phases: a MgO phase and a YAP phase (comparative sample 18); a sample consisting of two phases: a MgO phase and a spinel ($MgAl_2O_4$) phase (comparative sample 19); a sample consisting of two phases: a spinel ($MgAl_2O_4$) phase and a YAP phase (comparative sample 20); a sample consisting of a MgO single phase (comparative sample 21); a sample consisting of a $Y_2O_3$ single phase (comparative sample 22); a sample consisting of an $Al_2O_3$ single phase (comparative sample 23); a sample consisting of a YAP single phase (comparative sample 24); and a sample consisting of a spinel ($MgAl_2O_4$) single phase (comparative sample 25) were prepared. These are comparative samples.

(Evaluation Method)

a. A composition of each of the evaluation samples was analyzed using a composition analysis X-ray diffraction (XRD) unit. A result of the analysis is illustrated in FIG. 3.

b. Calculation of Volume Fraction of Each Phase

When the starting raw material prepared by mixing the MgO powder, the $Al_2O_3$ powder and the $Y_2O_3$ powder is sintered to produce composite ceramic body of the present invention, the following reaction occurs. However, it is necessary that the mixing ratios of the MgO powder, the $Al_2O_3$ powder and the $Y_2O_3$ powder are adjusted to fall within the range allowing the three phases consisting of the MgO phase, the $MgAl_2O_4$ phase and the YAP phase to be formed, as illustrated in FIG. 1.

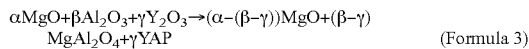

(Formula 3)

In this case, the composite ceramic body of the present invention satisfies the following conditions: $\beta > \gamma$, and $\alpha > (\beta - \gamma)$ A composition (volume %) of each of the sintered bodies calculated by the Formula (3) using a molecular mass (MgO: 40.30, $Al_2O_3$: 101.96, $Y_2O_3$: 225.81, $MgAl_2O_4$: 142.27, YAP: 163.89) and a theoretical density (MgO: 3.59 g/cm$^3$, $MgAl_2O_4$: 3.58 g/cm$^3$, YAP: 5.35 g/cm$^3$) is illustrated in FIG. 3. That is, each of $\alpha$, $\beta$ and $\gamma$ is determined by a molar ratio (calculated from weight and molecular mass) of a respective one of the raw material powders, and a molar ratio of each of the three phases is determined by the Formula (3). Then, the molar ratio of each of the three phases is converted into a volume ratio (volume %) using a molecular mass and a theoretical density of each of the three phases.

c. Measurement of Bending Strength

A bending strength of each of the sintered bodies was measured. The measurement was performed using a three-point bending method (JIS R 1601). A result of the measurement is illustrated in FIG. 4.

d. Measurement of Hardness

A hardness of each of the sintered bodies was measured by a Vickers hardness test. A weight was 1 (kgf). A result of the measurement is illustrated in FIG. 4.

e. Measurement of Electric Resistance

An electrical resistivity was measured using a high resistance meter (JIS K 6911 Standard). Measurement conditions were as follows: in air atmosphere, 27° C., and applied voltage: 10 (V). A result of the measurement is illustrated in FIG. 4.

(Evaluation Result)

a. Result of Composition Analysis

Each of the inventive samples 1 to 15 had peaks of only MgO, $MgAl_2O_4$ and YAP. Thus, it was ascertained that the sintered body of each of the samples 1 to 15 consists of the three phases. Each of the inventive samples 16, 17 had peaks of MgO, $MgAl_2O_4$, YAP and carbon. Thus, it was ascertained that the sintered body of each of the samples 16 and 17 consists of four phases: the above three phases and carbon (graphite).

On the other hand, the comparative sample 18 consisted only of two phases: a MgO phase and a YAP phase. The comparative sample 19 consisted only of two phases: a MgO phase and a $MgAl_2O_4$ phase. The comparative sample 20 consisted only of two phases: a $MgAl_2O_4$ phase and a YAP phase. The comparative sample 21 consisted only of a single phase: a MgO phase. The comparative sample 22 consisted only of a single phase: a $Y_2O_3$ phase. The comparative sample 23 consisted only of a single phase: an $Al_2O_3$ phase. The comparative sample 24 consisted only of a single phase: a YAP phase. The comparative sample 25 consisted only of a single phase: a $MgAl_2O_4$ phase.

The above compositions of the inventive samples and the comparative samples were plotted on FIG. 2. It is to be noted that the samples 16, 17, 22 and 23 containing a phase other than the three phases are not plotted on FIG. 2, because FIG. 2 is a MgO—$MgAl_2O_4$—YAO ternary diagram. Just for information, when the inventive samples 16 and 17 are presented based on only the three phases thereof while excluding the carbon, they are plotted on the same point as that of the sample 3 in FIG. 2.

b. Result of Measurements on Bending Strength and Hardness

The inventive samples 1 to 17 had significantly high bending strength and hardness, as compared to the comparative sample 21 consisting of the MgO single phase.

In particular, the samples 1 to 13 and the samples 15 to 17 are plotted in the range meeting the following condition: on an assumption that a volume percent of the YAP phase and a volume percent of the $MgAl_2O_4$ phase are represented, respectively, by $S_{YAP}$ (volume %) and $S_{MgAl}$ (volume %), the $S_{YAP}$ and the $S_{MgAl}$ satisfy the following relationship: $S_{YAP}/(S_{YAP}+S_{MgAl}) \leq 0.69$. Therefore, each of the samples 1 to 13 and the samples 15 to 17 had a bending strength of 300 MPa or more. The sample 14 failing to meet the above condition also had a bending strength of 300 MPa or more. However, the sample 19 mostly comprises YAP, which leads to a relatively high manufacturing cost.

Further, the samples 1 to 13, 16 and 17 are plotted in the range meeting the following condition: the $S_{YAP}$ and the $S_{MgAl}$ satisfy the following relationship: $S_{YAP}/(S_{YAP}+S_{MgAl}) \leq 0.69$; and, on an assumption that a volume percent of the MgO phase is represented by $S_{MgO}$ (volume %), the $S_{MgO}$, the $S_{YAP}$ and the $S_{MgAl}$ satisfy the following relationships: when $S_{MgO} \geq 60$ (volume %), $S_{YAP} \geq 1$ (volume %) and $S_{MgAl} \geq 1$ (volume %) (D3-1 in FIG. 2); and when $10 \leq S_{MgO} < 60$ (volume %), $S_{YAP} \geq 10.5$ (volume %) (D3-2 in FIG. 2). Therefore, each of the samples 1 to 13, 16 and 17 had a bending strength of 350 MPa or more, and up to 570 MPa. Each of the samples falling within this range has a significantly high bending strength, as compared to the sample beyond this range (the inventive samples 14 and 15, and the comparative samples 18 to 21).

The inventive samples 16 and 17 added with carbon also had a bending strength of 400 MPa or more. Carbon may be replaced with an electrical conductive substance non-reactive with MgO, $MgAl_2O_4$ and YAP, such as titanium carbide, titanium nitride, tungsten carbide, tungsten nitride, molybdenum carbide, molybdenum nitride, zirconium carbide, zirconium nitride, zirconium boride, zirconium silicide or carbon nanotube. In this case, it is expected that the same effect can be obtained.

In the samples 3, 5, 6, 11 each consisting of three phases; the MgO phase, the $MgAl_2O_4$ phase, and the YAP phase, the comparative sample 18 consisting of two phases: the MgO phase and the YAP phase, and the comparative sample 20 consisting of two phases: the $MgAl_2O_4$ phase, and the YAP phase, an amount of the YAP phase in each of the above samples is the same. Comparing these samples, the samples 3, 5, 6, 11 each composed of the three-phase composite ceramic body had significantly improved hardness and bending strength, as compared to the comparative sample 18 consisting of two phases: the MgO phase and the YAP phase, and had higher bending strength, as compared to the comparative sample 20 consisting of two phases: the $MgAl_2O_4$ phase, and the YAP phase. That is, the replacement of a part of the MgO phase with the $MgAl_2O_4$ phase has an effect on increasing the hardness and bending strength.

Then, comparing the sample 1 with the comparative samples 18 and 19, the inventive sample 1 comprising the three phases had higher bending strength and hardness, as compared to the comparative samples 18 and 19 each consisting of two phases. An amount of any phase other than the MgO phase in each of the samples is the same.

As is evident from the above comparisons, the composite ceramic body of the present invention comprising the three phases has higher bending strength, as compared to the composite ceramic body consisting only of two phases.

c. Result of Measurement of Electrical Resistivity

Each of the inventive samples 16 and 17 was prepared by adding a graphite (C) powder. The samples 16 and 17 exhibited an electrical resistivity of $10^5$ Ωcm and an electrical resistivity of $10^3$ Ωcm or less, respectively. The addition of an electrical conductive fourth phase to the three-phase ceramic body contributes to adjustment of an electrical resistivity of the sintered body.

Example 2

Example 2 is a result of evaluation on resistance to corrosion of a composite ceramic body.

(Preparation of Samples)

In the same manner as that in Example 1, sintered bodies were obtained. Each of the sintered bodies was formed in a shape having a diameter of 30 mm and a thickness of 3 mm. A part of the sintered body was masked by a masking tape to prepare a measurement sample. A starting raw material of the sample and a composition of the sintered body are as illustrated in FIG. 3.

(Plasma Etching Method Using Halogen Based Corrosive Gas)

Each of the measurement samples was etched by plasma etching. An equipment used for etching was a parallel plate reactive ion/plasma etching equipment. $CF_4$ was used as an etching corrosive gas. A pressure of the $CF_4$ was 10 Pa. A total etching time was 120 minutes. On the above conditions, each of the samples 1 to 17 was subjected to plasma etching. Each of the comparative samples 18 to 25 was also subjected to the same treatment.

(Evaluation Method for Resistance to Corrosion)

After etching, an etched amount was measured. Specifically, after etching, the masking tape was peeled from the measurement sample, and a step height between an etched surface and a masked (un-etched) surface was measured. The measured step height was used as an etched amount (corroded amount).

An etched amount of $Al_2O_3$ of the comparative sample 23 was defined as 1, and an etched amount of each of the remaining samples was compared therewith. The step height was measured by a contour measuring instrument (SURFCOM 2800 produced by Tokyo Seimitsu Co., Ltd).

(Result of Evaluation on Resistance to Corrosion)

A etched amount of each of the inventive samples 1 to 17 was as small as ¼ or less of that of $Al_2O_3$ of the comparative sample 23. Each of the inventive samples has a feature of being insusceptible corrosion.

Each of the inventive samples 1 to 17 contains a MgO phase in an amount of 10 volume % or more. Each of the inventive samples 1 to 17 has higher resistance to corrosion, as compared to the $MgAl_2O_4$ single phase (comparative sample 25). Further, each of the inventive samples 1 to 17 containing a MgO phase in an amount of 10 volume % or more has resistance to corrosion equal or superior to those of the comparative sample 24 as a YAP single phase and the comparative sample 22 as a $Y_2O_3$ single phase. This result shows that the composite ceramic body of the present invention comprising the three phases can suppress a deterioration in resistance to corrosion due to a component other than MgO.

Each of the inventive samples 16 and 17 further comprise carbon as a fourth phase and exhibit a low electrical resistivity. Each of the inventive samples 16 and 17 maintained high resistance to corrosion even after addition of carbon. A level of deterioration in resistance to corrosion of the inventive sample further comprising the fourth phase was low, as compared to the inventive samples each devoid of the fourth phase.

What is claimed is:

1. A composite ceramic body comprising three phases comprising a MgO phase, a YAP phase and a $MgAl_2O_4$ phase, with at least one of:
    the MgO phase comprising at least 10 (volume %), and
    the $MgAl_2O_4$ phase comprising less than 79.2 (volume %).

2. The composite ceramic body as defined in claim 1, wherein, on an assumption that a volume percent of the YAP phase and a volume percent of the $MgAl_2O_4$ phase are represented, respectively, by $S_{YAP}$ (volume %) and $S_{MgAl}$ (volume %), the $S_{YAP}$ and the $S_{MgAl}$ satisfy the following relationship:

$$S_{YAP}/(S_{YAP}+S_{MgAl}) \leq 0.69.$$

3. The composite ceramic body as defined in claim 2, wherein, on an assumption that a volume percent of the MgO phase is represented by $S_{MgO}$ (volume %), the $S_{MgO}$, the $S_{YAP}$ and the $S_{MgAl}$ satisfy the following relationships:

when $S_{MgO} \geq 60$(volume %), $S_{YAP} \geq 1$(volume %) and $S_{MgAl} \geq 1$(volume %); and when $10 \leq S_{MgO} < 60$(volume %), $S_{YAP} \geq 10.5$(volume %).

4. The composite ceramic body as defined in claim 1, which further comprises, as a fourth phase, 0.01 to 50 volume % of a phase of electrical conductive substance.

5. The composite ceramic body as defined in claim 4, wherein the electrical conductive substance is one or more, or a solid solution of two or more, selected from the group consisting of graphite, titanium carbide, titanium nitride, tungsten carbide, tungsten nitride, molybdenum carbide, molybdenum nitride, zirconium carbide, zirconium nitride, zirconium boride, zirconium silicide, and carbon nanotube.

6. Component parts for a semiconductor manufacturing equipment, comprising the composite ceramic body as defined in claim 1.

7. The composite ceramic body as defined in claim 1, the MgO phase comprising at least 10 (volume %).

8. The composite ceramic body as defined in claim 1, the $MgAl_2O_4$ phase comprising less than 79.2 (volume %).

* * * * *